US006525431B1

(12) United States Patent
Clucas et al.

(10) Patent No.: US 6,525,431 B1
(45) Date of Patent: Feb. 25, 2003

(54) CO-GENERATION SYSTEM EMPLOYING A STIRLING ENGINE

(75) Inventors: Donald Murray Clucas, Christchurch (NZ); Murray Bruce Aitken, Christchurch (NZ)

(73) Assignee: Whisper Tech Limited, Christchurch (NZ)

( * ) Notice: Subject to any disclaimer, the term of this patent is extended or adjusted under 35 U.S.C. 154(b) by 0 days.

(21) Appl. No.: 09/601,783

(22) PCT Filed: Feb. 9, 1999

(86) PCT No.: PCT/NZ99/00017

§ 371 (c)(1), (2), (4) Date: Aug. 7, 2000

(87) PCT Pub. No.: WO99/40310

PCT Pub. Date: Aug. 12, 1999

(30) Foreign Application Priority Data

Feb. 9, 1998 (NZ) ............................................. 329744

(51) Int. Cl.[7] ........................... B60L 1/02; F01K 15/00; F01K 17/02; F02C 6/00; F02C 6/18

(52) U.S. Cl. ........................................... 290/2; 290/1 R

(58) Field of Search ....................... 290/2, 1 R; 60/659, 60/645, 517; 62/238.9; 237/12.1

(56) References Cited

U.S. PATENT DOCUMENTS

| | | | | | |
|---|---|---|---|---|---|
| 4,389,844 A | * | 6/1983 | Aokermann et al. | .......... | 60/517 |
| 4,503,337 A | * | 3/1985 | Hafner et al. | ............... | 290/1 A |
| 4,657,290 A | * | 4/1987 | Linden | .......................... | 290/2 |
| 4,680,478 A | * | 7/1987 | Wicks | ........................... | 290/2 |
| 4,736,111 A | | 4/1988 | Linden | .......................... | 290/2 |
| 4,873,840 A | | 10/1989 | Gilliusson | .................. | 62/238.6 |
| 5,074,114 A | * | 12/1991 | Meijer et al. | ............... | 290/1 R |
| 5,323,061 A | | 6/1994 | Immler et al. | ................. | 290/2 |
| 5,385,214 A | * | 1/1995 | Spurgeon | .................... | 165/902 |
| 5,432,710 A | * | 7/1995 | Ishimaru et al. | ............ | 705/412 |
| 5,617,504 A | * | 4/1997 | Sciacca et al. | .............. | 219/492 |
| 5,626,103 A | * | 5/1997 | Haws et al. | ................ | 122/1 R |
| 5,719,990 A | * | 2/1998 | Yang | ............................ | 290/2 |
| 5,903,060 A | * | 5/1999 | Norton | ...................... | 237/8 D |
| 6,220,030 B1 | * | 4/2001 | Clucas et al. | ................ | 60/517 |

FOREIGN PATENT DOCUMENTS

WO WO 92/07170 4/1992

OTHER PUBLICATIONS

*Development of the TEM Stirling Engine*; Schroder et al., from proceedings of the 7th International Conference on Stirling Cycle Machines, Nov. 5–8, 1995, Tokyo, pp. 217–222.

*The Stirling Engine in a Co–Generation System*, Mitzel et al., from the proceedings of the 7th International Conference on Stirling Cycle Machines, Nov. 5–8, 1995, Tokyo, pp.541–545.

* cited by examiner

*Primary Examiner*—Nestor Ramirez
*Assistant Examiner*—Julio C. Gonzalez
(74) *Attorney, Agent, or Firm*—Greer, Burns & Crain, Ltd.

(57) ABSTRACT

A co-generation system for producing heat, hot water and electricity for a building is provided while generating a minimum of noise and vibration within the building. The system includes an engine and burner with a generation; a storage tank, for storage of primary water, which is adapted to contain therein the engine and generator; apparatus for circulating and heating the primary water, and apparatus for venting exhaust gases to the outside of the building. The hot water may also be secondary water and either or both water may be potable. The engine optimally operates on a Stirling cycle. The building may be a commercial or domestic dwelling which is free standing or part of a larger structure or may be mobile.

12 Claims, 4 Drawing Sheets

CO-GENERATION SYSTEM EMPLOYING A STIRLING ENGINE

TECHNICAL FIELD

The present invention relates to improvements in co-generation systems, and more particularly in systems that can be used in domestic or small commercial settings.

BACKGROUND ART

Co-generation is generally defined as a process where an engine is used to generate both heat and electrical power. It also generally refers to the use of the waste heat from the engine as the source of heat for space heating of the dwelling in which the process occurs. Also, the space heating is either by use of hot water in space heaters or by forced air heaters.

Example of prior art of co-generation system can be seen in U.S. Pat. No. 4,680,478 (Wicks) and subsequent articles in Popular Science, such as "Home-size Co-generator" by V. Gilmore, on this invention by Wicks. The co-generation system disclosed uses an internal combustion engine and a forced air heat exchanger. However, as discussed by Meijer in U.S. Pat. No. 5,074,114, such engines have a short life and high maintenance costs.

Alternatives to the internal combustion engine in such a co-generation system were discussed in the publication "Stirling-Cycle Machines" by G. Walker (Oxford, 1973). This discloses the Stirling engine and gas turbine as alternatives to the internal combustion engine in co-generation systems.

Meijer also discloses a co-generation system with a Stirling Cycle engine. Meijer addresses some of the above problems, disclosing a system in which the Stirling engine can run on one of a variety of fuels, in which excess electricity can be sold to the national grid or local power network; and in which a heat exchanger is added to recover heat from the exhaust gases of the engine, for use in space heaters and the like.

However there are two problems of co-generation systems that are not addressed in any of the known co-generation systems disclosed above. The first of these is the sometimes unacceptable noise and vibration of the engine within the system. This is of especial concern where the co-generation system is set within a domestic dwelling or small commercial building. Further, none of the prior art discloses a system that is of a size to be usable in a mobile situation, for example, in a vehicle designed for living in, or a yacht. An aircraft is also a possible vehicle.

Also, at present the disclosed, known methods of co-generation mainly use open systems in heat reticulation. One partially closed system is disclosed in Meijer. However this closed system uses only a forced air heater, or an air conditioner. Extensive systems of heat usage with water, and water or air reclamation, are not disclosed.

An object of the present invention is the provision of a co-generation system for a domestic or commercial building, being a system which includes a water storage tank, whereby the system provides for secondary heat recovery from the engine, and provides means for reduction in the vibration and noise of the engine used. A further object of the present invention is the provision of a co-generation system whereby the storage tank for the coolant water and the coolant water itself are used for the secondary heat exchange and as the means to reduce the noise and vibration of the engine.

A yet further object of the present invention is the provision of a co-generation system that takes up no more room than a hot water storage tank.

Another object of the present invention is to address the problems discussed above, or at least to provide the public with a useful choice.

Further aspects and advantages of the present invention will become apparent from the ensuing description which is given by way of example only.

DISCLOSURE OF INVENTION

The present invention provides a co-generation system for producing heat, hot water, and electricity, said system being contained within a building and said system comprising:

an engine with a burner and an electric generator;

a tank for storage of primary water, means for circulating said primary water about said engine;

means for venting exhaust gases from said engine to the outside of the building housing the co-generation system, said means including a first heat exchanger for cooling said exhaust gases;

means for circulating the primary water to and from the first heat exchanger to produce said heat;

means for directing said heat to space heaters; and wherein the improvement comprises:

the water storage tank being adapted to contain therein the engine and generator in fluid isolation from the primary water within the storage tank, said tank and primary water providing means to reduce noise and vibration of the co-generation system.

According to another aspect of the invention there is provided a co-generation system as described above, wherein said means for directing heat includes a second heat exchanger, wherein said second heat exchanger heats secondary water. If hot water is to be drawn from said system, the hot water is either the primary water or the secondary water.

According to another aspect of the invention there is provided a co-generation system as described above, in which the system is usable in mobile buildings. For the purposes of this specification, the term "mobile building" is used to define, but is not limited to, movable dwellings, movable homes or vehicles, yachts, and the like.

Optionally, the hot water drawn from the system is potable. Optionally, said tank is also a primary heat exchanger from the exhaust gas to the primary water. Preferably the storage tank includes a cavity which is adapted to contain the engine and generator.

Preferably, said engine is a Stirling engine. Preferably, said engine is a Stirling engine which can operate on one of a plurality of fuels. Preferably, the system also includes a heat sink or heat exchanger that can be used to transfer excess heat out of the system when the system is required for electricity generation only, and not for heat generation.

Optionally, the system also includes the ability to transfer excess electricity to the national power grid or to another power storage facility (for example, battery storage of known type) when only heat is drawn from the system.

BRIEF DESCRIPTION OF THE DRAWINGS

By way of example only, preferred embodiments of the system of the present invention are described in detail, with reference to the use of a multi-fuel Stirling engine, and with reference to the accompanying drawings, in which.

BEST MODES FOR CARRYING OUT THE INVENTION

Figure 1:
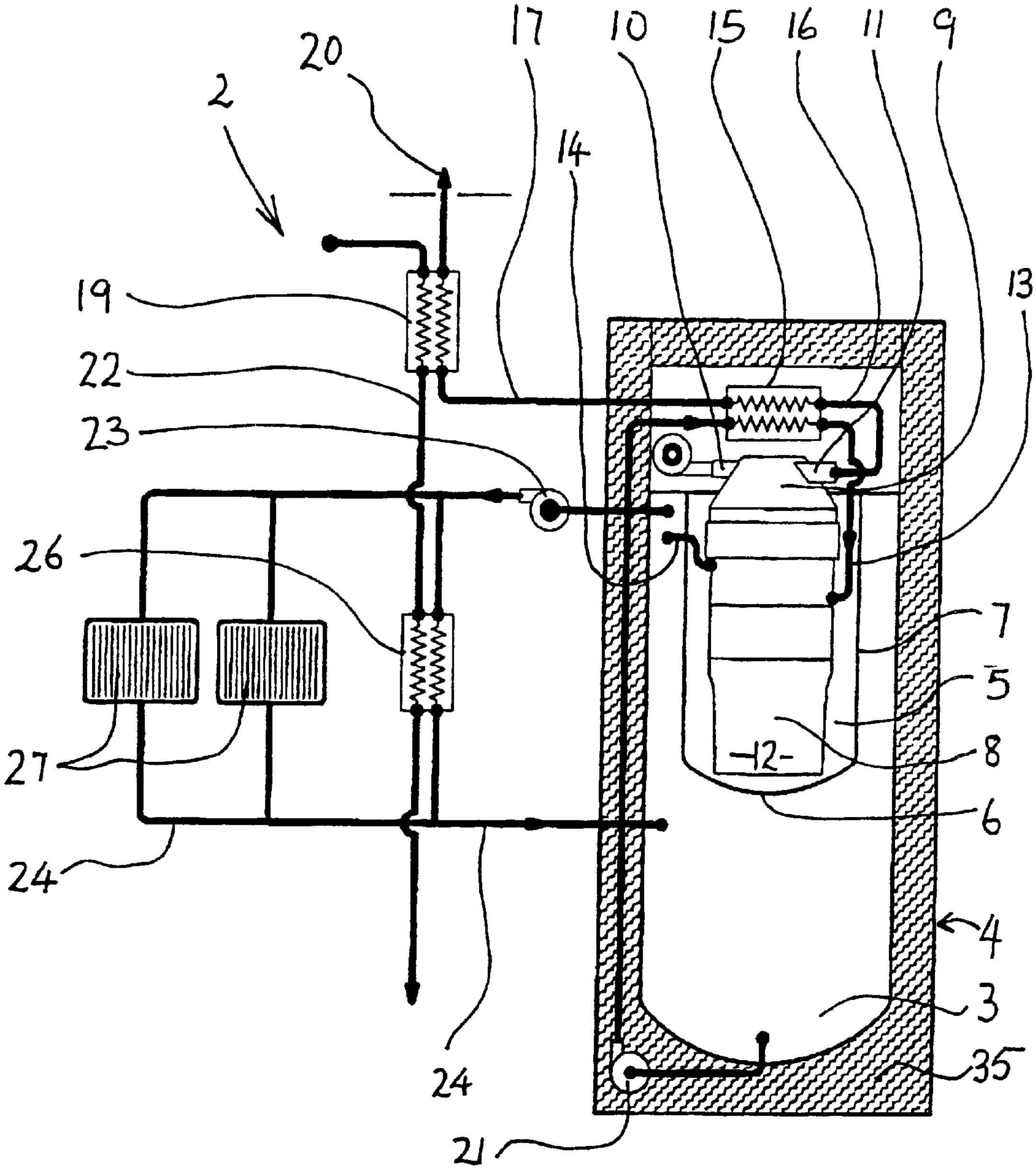
FIG. 1 is a diagrammatic arrangement of the elements of a first preferred embodiment of the co-generation system of the present invention.

Referring to FIG. 1 of the drawings, a first preferred embodiment of the co-generation system 2 of the present invention is thereshown. The co-generation system 2 includes a water storage tank 3 enclosed within an outer casing 4, for housing primary water. The outer casing 4 is shaped and constructed to stand alone or to be supported or suspended in an elevated position.

Between the storage tank 3 and the outer casing 4 is an insulating material 35, of known type, which is packed about the storage tank 3, in known manner. The insulating material 35 generally aids in supporting the storage tank 3 within the outer casing 4, in addition to its primary function of insulation. Such known arrangements can include, for example, a commercially available domestic hot water cylinder and outer casing.

The storage tank 3 includes a shaped cavity 5 in the upper portion thereof. The size of the storage tank 3, and therefore the size of the cavity 5, will depend to some extent on the size of the co-generation system 2 required for the building in which it is operating. However, the capacity of the storage tank 3 can be in the range 20 litres to 1,000 litres of water.

Figure 2:
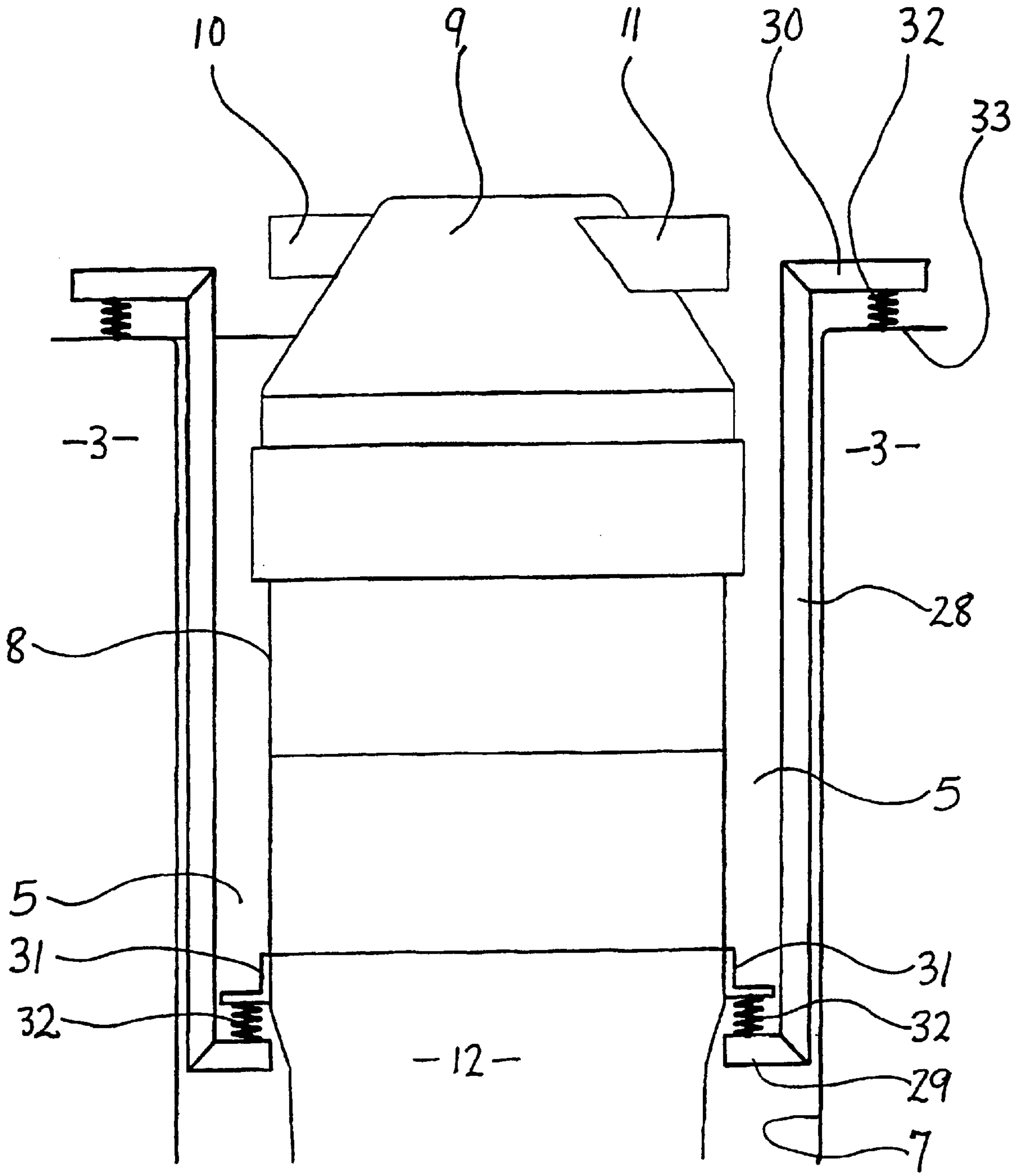
FIG. 2 is a partial section view of the Stirling engine used in the co-generation system of the present invention.

The cavity 5 includes an arcuate bottom 6 and straight sides 7 and is generally circular in cross-section. Referring also to FIG. 2, the cavity 5 is of a size that is capable of receiving therein an engine 8 of the co-generation system 2.

Referring to FIGS. 1 and 2, the engine 8 is shown diagrammatically as a Stirling engine 8. The engine 8 includes a single burner 9 (with associated air pump) with an air inlet 10 and an exhaust outlet 11. The engine 8 also houses a known generator (not shown, but incorporated generally with the engine reference numeral 8) at the lower end 12 thereof. The generator is connected in known manner to the output shaft (not shown) of the engine 8.

Referring to FIG. 1, the primary pipes (13, 14) connect the storage tank 3 to the engine coolant outlet and inlet respectively, in known manner. A small water pump 21 (for example, an impeller type pump) is used to assist in the circulation of primary water to and from the storage tank 3 and around the primary pipes (13, 14).

The primary pipe 13 is connected to a first heat exchanger 15. The exhaust outlet 11 from the engine 8 is connected by the piping 16 to the first heat exchanger 15. The first heat exchanger 15 has a gas outlet piping 17 in which the exhaust gas is at a temperature not greater than 90° C. The outlet piping 17 passes through a second heat exchanger 19, further reducing the temperature of the exhaust gas.

The gas travels from the second heat exchanger 19 to the exterior 20 of the building. The first heat exchanger 15 is of any known type of gas/liquid heat exchanger and can include, for example, a coil heat exchanger or a finned heat exchanger, both of known type.

In this first embodiment of the co-generation system 2, the direction of the primary water from the storage tank 3 is as follows: from storage tank 3 the water is moved via the pump 21 to the first heat exchanger 15. From the first heat exchanger 15 the partially heated primary water is transferred through the primary pipe 13 to act as coolant water for the engine 8. From the engine 8, the primary pipe 14 carries the fully heated primary water to the storage tank 3 where it is stored until used in the space heating reticulation as described below.

The heated primary water stored in the storage tank 3 is used for space heating, in known manner, in a reticulation system in the building, by the operation of a pump 23, a secondary pipe 24 and water space heaters 27. With appropriate valves and taps (not shown) a water/water heat exchanger 26 can be switching into this reticulation system. The water/water heat exchanger 26 is used to further heat potable hot water for later use. In addition, the potable water also receives preliminary heating in the second heat exchanger 19, which is a gas/liquid heat exchanger using the exhaust gas from the engine 8. The potable water travels between the second heat exchanger 19 and the water/water heat exchanger along the contributory pipe-work 22.

The reticulation system is denoted by the water route through storage tank 3, the secondary pipe-work 24, the heat exchanger 26, the water space heaters 27, and back to the storage tank 3. This reticulation is a closed loop or closed system.

Referring to FIG. 1, the manner of securement of the engine 8 within the storage tank 3 is shown. The engine 8, with the exception of the top of the burner 9, the exhaust inlet 10 and outlet 11, is positioned within the cavity 5. The cavity 5 is straight sided, with a circular cross-section. The bottom 6 of the cavity 5 is arcuate.

Referring to FIG. 2, four engine mount supports 28 are spaced evenly about the engine 8. Each support 28 includes a lower flange 29 at one end of the support 28. Each lower flange 29 is adapted for receiving a bolt of known type (not shown) therethrough. Each support 28 includes an upper flange 30 at a second end. Each upper flange 30 is adapted from receiving a bolt of known type (not shown) therethrough. The upper flange 30 points outward from the engine 8, and the lower flange 29 faces inward, relative to the engine 8. It will be appreciated that the number of mounts 28 and associated parts can be greater or fewer than four (for example, three or six).

Secured to the engine 8 are four lugs 31, each positioned to engage with a lower flange 29. A shock absorber 32 is secured between each lug 31 and the respective lower flange 29 by the bolts and nuts. In like fashion, a shock absorber 32 is secured between each respective upper flange 30 and a section of the wall 33 of the storage tank 3. The shock absorbers 32 can be of any known type, for example a spring shock absorber or a rubber shock absorber. The shock absorber 32 could also be of a plastic material, if so desired.

The effect of this described arrangement of the first preferred embodiment of the engine mounting is that the engine 8 is "soft mounted" within the cavity 5. However, in a second preferred embodiment, the engine 8 is "hard mounted", without isolation between the engine 8 and the storage tank 3. This is achieved by using bolts without shock absorbing means (32) associated with the engine mounts 28 of the engine 8.

These two preferred embodiments of the mounting of the engine 8 each aid in substantially reducing the vibration and noise transmitted from the engine 8 to the dwelling or building. The transfer of the vibration from the engine 8 is to the storage tank 3, and its absorption in the tank 3 indirectly aids in generating heat within the storage tank. Thus the arrangement of the shape of the storage tank 3 and the placement of the engine 8 in the cavity 5 ensures that the cavity 5 and the storage tank 3 also act as a subsidiary means of heat transfer to the water in the storage tank 3.

The cavity 5 has been described as including straight sides 7 and a bottom 6, with a circular cross-section. However it will be appreciated that the cavity 5 may be of a different shape and cross-section, as is desired, without departing from the scope of the invention. For example, the cavity 5 may be square or rectangular in cross-section. Also, the cavity 5 may be profiled or contoured to a shape slightly larger than the shape of the engine 8 contained within the cavity 5.

Similarly, the space between the straight sides 7 and the engine 8 at present is unspecified. Air is present in the first embodiment of the co-generation system 2 described above. However, it will be appreciated that the cavity 5 could be filled with a material that is highly heat conductive. Such a material would additionally act as a part of the supplementary heat exchanger to transfer heat from the engine 8 to the primary water in the storage tank 3.

If so desired, and with minimal rearrangement, in a further embodiment of the cavity 5, this cavity 5 could optionally be used to conduct pre-combustion air from the inlet 10 through this cavity 5 before it enters the burner 9.

In a further preferred embodiment of the storage tank 3 and engine 8, the cavity 5 could be completely absent The casing of the engine 8 is adapted as the wall of the cavity 5, thereby transmitting noise and vibration directly to the storage tank 3 and into the water in a more efficient manner.

Referring to FIG. 1, the most efficient temperature of the primary water in the storage tank 3 will be dependent on a large number of factors. However, in practice it has been found that (regardless of the size of the storage tank 3) the most efficient primary water temperature for the storage tank 3 is in the range 65 to 80° C. With the first embodiment of the co-generation system 2 as described above, with an exit temperature for the exhaust gas of less than 90° C. and with the storage tank 3 temperatures in this range, it has been found in practice that an efficiency of 90% or more can be obtained for the calorific value of the fuel burnt; the output being electricity, heat or a combination thereof. Hot potable water is a further possible output.

Alternatively, if the efficiency of the cooling of the engine 8 is very efficient, to near 100% efficient, then an insulating material may be used in the cavity 5. Such an insulating material could be the same as that used for the material of insulating material 35, for example: fibre glass or matted, bat form or other known insulating material used in hot water cylinders or boilers.

Referring to FIG. 1, by appropriate arrangement and moulding, a suitable header tank of known type (not shown) for water entering the storage tank 3 could be placed above the first heat exchanger 15 and below the insulating material 35. Alternatively, the first heat exchanger 15 and engine 8 could be dropped further down into the storage tank 3 so that such a header tank could be inserted above the first heat exchanger 15, within the storage tank 3.

Figure 3:
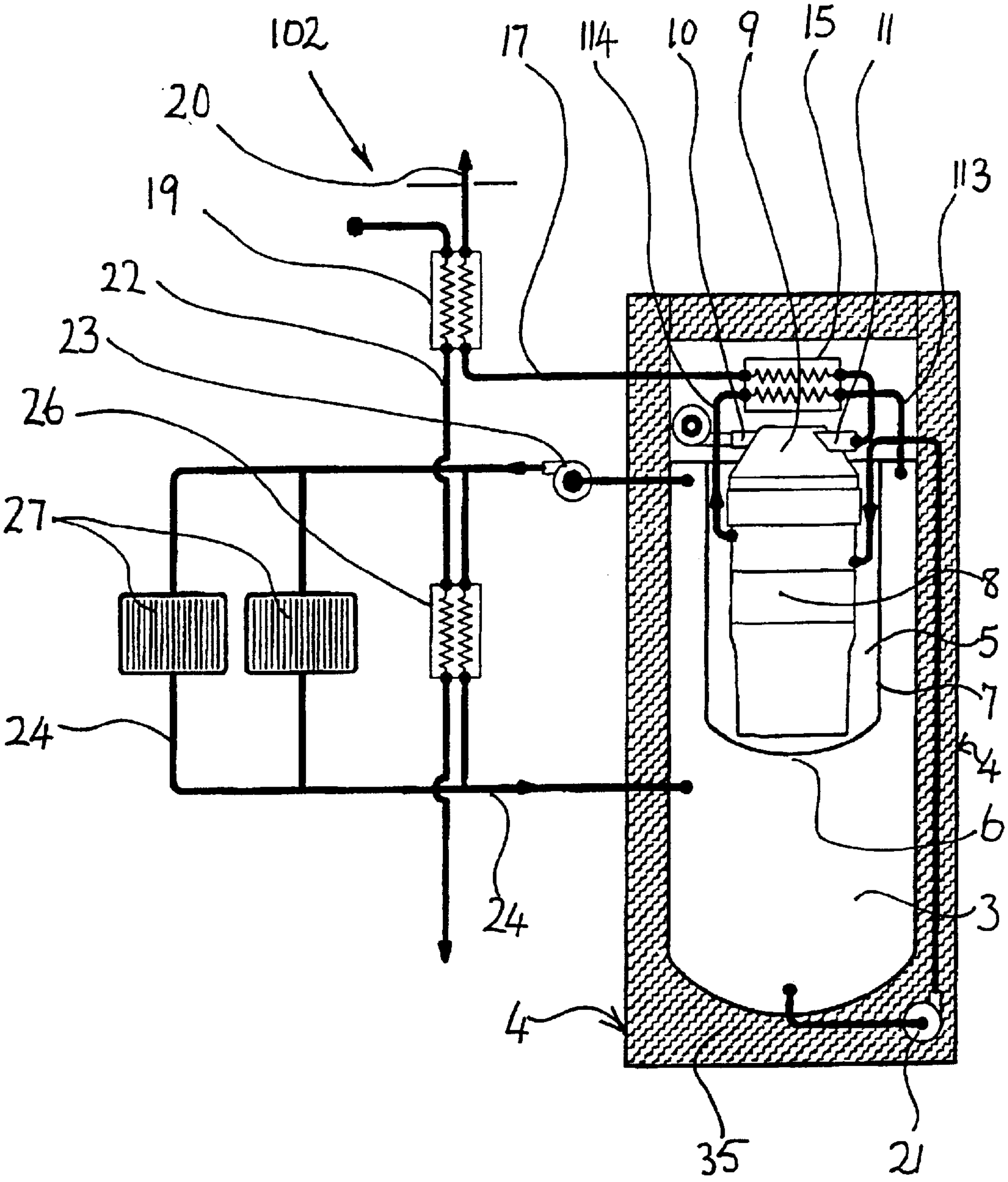
FIG. 3 is a diagrammatic arrangement of the elements of a second preferred embodiment of the co-generation system of the present invention.

A second embodiment of the co-generation system 102 is shown in FIG. 3. Like numbered parts, performing in similar manner, or being the same as in the first embodiment of the co-generation system 2, have the same number.

In this embodiment, the heat exchange in the reticulation system occurring between the primary water in the storage tank 3 and the water space heaters 27 and heat exchanger 26 is identical to the arrangement in the first preferred co-generation system 2. However, the arrangement of heat exchange of the primary water with the exhaust gas and the engine 8 cooling is altered to a second preferred embodiment.

In this second embodiment of the co-generation system 102, the primary water from storage tank 3 leaves storage tank 3 via the pump 21 and enters the engine 8 to act as the engine 8 coolant. The primary pipe 114 transfers the partially heated primary water to the first heat exchanger 15. The primary pipe 113 transfers the now fully heated primary water back to the storage tank 3.

Thus, in this second embodiment, the temperature of the exit gases from the first heat exchanger 15 will be higher than that in the first embodiment This will cause the second heat exchanger 19 to be more efficient than in the first preferred embodiment However, this will be offset by the slightly lower efficiency of the first heat exchanger 15.

Figure 4:
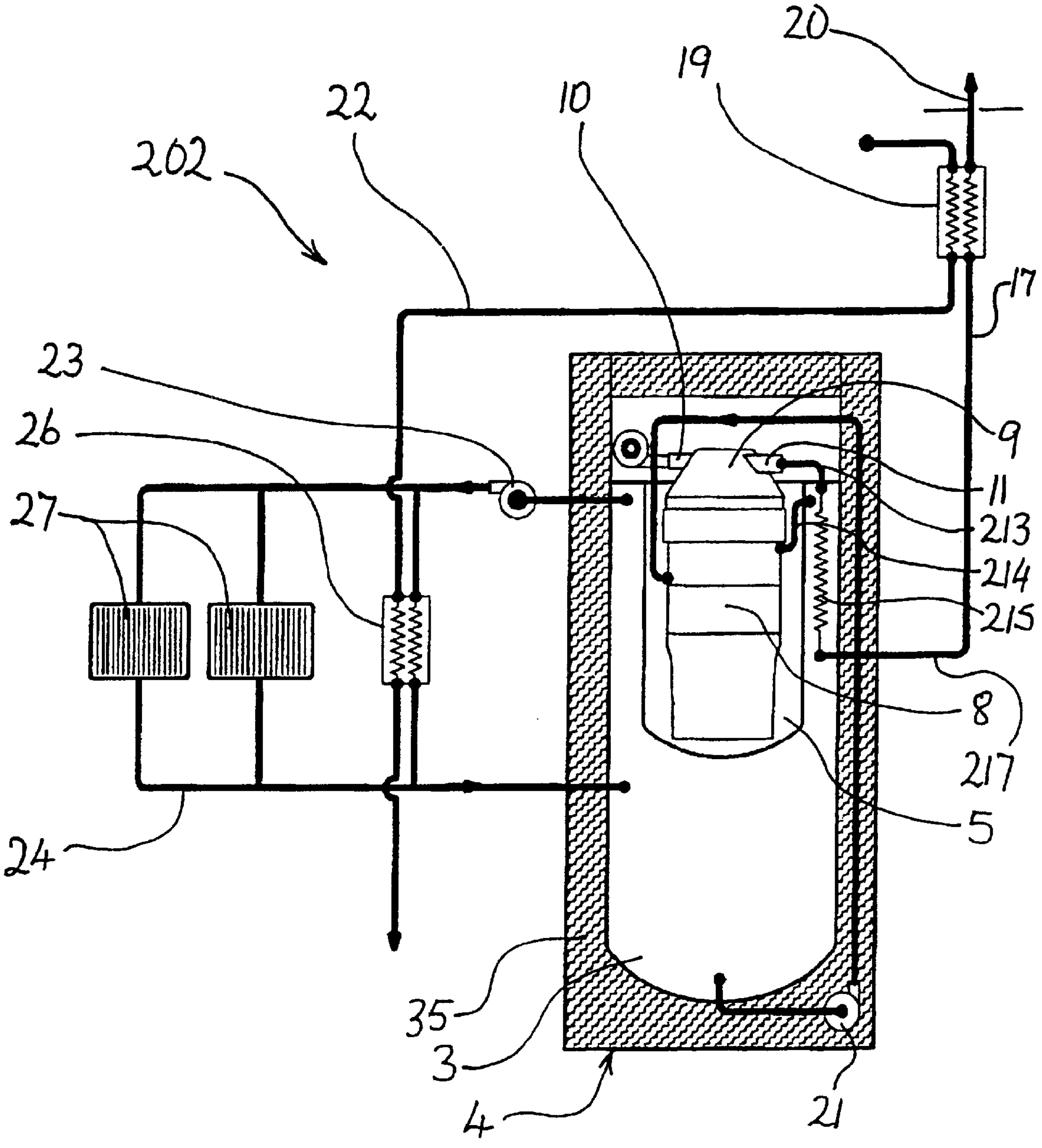
FIG. 4 is a diagrammatic arrangement of the elements of a third preferred embodiment of the co-generation system of the present invention.

A third preferred embodiment of the co-generation system 202 is shown in FIG. 4. Where like parts are used in the same manner as the first preferred embodiment, they have the same number. In this embodiment of the co-generation system 202, the space heating reticulation system (using the pump 23, the water space heaters 27, the secondary pipework 24 and the heat exchanger 26) is unchanged from that previously described in the first preferred embodiment.

Within the outer casing 4 of the storage tank 3 the modification is that the first heat exchanger 15 is omitted and the storage tank 3 acts as the primary or main heat exchanger. This is achieved by the transfer of primary water via the pump 21 to the engine 8 to act as the engine coolant (as previously described). From the engine 8 the primary pipe 214 leads directly back to the storage tank 3.

The gas exhaust from the burner 9 travels via the outlet 11 to a coil heater exchanger 215 within the storage tank 3. The outlet from the heat exchanger 215 is through the outlet piping 217 to the exterior 20, which operates as previously described. The heat exchanger 215 may be any known type of coil or finned heat exchanger.

In this third embodiment of the co-generation system 202, the movement of the primary water from the storage tank 3 to the engine 8, and from the storage tank 3 to the space heating reticulation by the pump 23 ensures movement of the water within the storage tank 3, so that layering of heat within the storage tank 3 does not occur. This ensures that the heat exchange via heat exchanger 215 operates at the maximum possible efficiency. The coil heat exchanger 215 is shown in FIG. 4 as being immediately adjacent the engine 8 within the storage tank 3. However, it will be appreciated that the placement of the coil heat exchanger 215 may be at any point within the storage tank 3 for convenience and maximum efficiency of operation.

In the second and third embodiments (FIGS. 3 and 4) the mounting of the engine 8 is as described above for the first preferred embodiment of the co-generation system 2.

The co-generation system (2, 102, 202) has been described with reference to a Stirling engine with a single burner 9. The number of cylinders (not shown) within the engine 8 is optimally four. However, it will be appreciated that the number of burners 9 and cylinders may be varied to suit the output heating and electrical generation requirements of the co-generation system (2, 102, 202). Additionally, if so desired, the Stirling engine may be a free-piston Stirling engine, or may be replaced with a gas turbine or an internal combustion engine.

Likewise, the embodiments described above all include or show two space heaters 27 in the reticulation of the heating. However, it will be appreciated that more than two space heaters 27 may be included in the space heating system. It will further be appreciated that previously extant space heating systems within a building can be adapted for connection, in known manner, to form part of the co-generation system (2, 102, 202).

The generator (not shown) used may be of any known type. Depending on the heat requirements of the building in question, the generator is most generally one that is less than 10 kilowatts in output. If more, or different, requirements are made on the electrical generation usage, battery storage of electrical energy may also be added, in known manner.

The three embodiments of the co-generation system (2, 102, 202) are described above indicating that the primary water in the storage tank 3 and its reticulation (both to heat the water and use of that heat) are closed systems. As such, anti-corrosion chemicals or corrosive inhibitors may be added to the water to preserve or extend the life of the pipes, valves, taps and the storage tank 3.

The heat exchange to potable water (carried in the pipe 22) is the disclosed method of providing potable hot water which is drawn from the co-generation system (2, 102, 202). However, it will be appreciated that such a system may be altered, in known manner, so that the primary water in storage tank 3 is the potable water which is drawn off as demand requires and is replaced by cold water.

Further, it will be appreciated that the space heating is conducted with heat exchange to the space heater (27) water could also be via one or more heat exchangers 26 with the hot potable water. This would mean that the space heating was a secondary use of the heated water, and not the primary use as described in the three embodiments above.

Also, it will be appreciated that, as with other known co-generation systems, forced air heaters may be used in a separate reticulation system or as a replacement reticulation system to the use of the water space heaters 27. The addition of an air/water heat exchanger of known type, proceeded with in known manner, could be included in the heat reticulation system about the building.

All heat exchangers (15, 19, 26, 215) described here are disclosed as counter-current heat exchangers. However, it will be appreciated that other known types of heat exchangers can be used, without departing from the scope of the invention. For example, co-flow heat exchangers may be used, with attendant rearrangement of pipe-work, in known manner, within the co-generation system (2, 102, 202).

Further, it will be appreciated that if the space heaters 27 (or equivalent) on the secondary pipe-work 24 are not providing sufficient heat, a booster heater (not shown) may be added to the heating reticulation. Such a booster heater could, for example, be from the group a gas heater, a diesel driven heater, an electric heater, a heater with an independent power source, or a combination thereof, as is desired.

Finally, as an additional embodiment, the use of the heat in an air conditioner may be incorporated into the system (2, 102, 202) in known manner.

Whilst the term "building" has been used through the detailed description of this invention, it will be appreciated by those skilled in the art, that this term encompasses a structure which can be selected from: a stand alone domestic dwelling; a domestic dwelling forming part of a larger construction, a commercial construction, and a mobile building. Optionally, the mobile building can be selected from a recreational vehicle, a mobile home, a mobile vehicle, a yacht, and an aircraft.

Aspects of the present invention have been described by way of example only and it should be appreciated that modifications and additions may be made thereto without departing from the scope thereof.

What is claimed is:

1. A co-generation system for producing useful heat and electricity, the system comprising:

- a tank configured for storing a liquid and having a wall and a cavity formed therein;
- a Stirling engine having a generator enclosed within and operatively connected to said Stirling engine;
- a circulation circuit configured for circulating said liquid between said tank and said engine to cool said Stirling engine;
- a reticulation system to provide space heating and configured for circulating said liquid between said tank and at least one of a space heater and a heat exchanger;
- an exhaust gas heat exchanger positioned within said tank and connected to said Stirling engine to exhaust gases from said Stirling engine;
- at least one engine mount substantially positioned within said cavity and having a lower flange and an upper flange; and
- at least two shock absorbers, one connecting said upper flange to said wall of said tank and the other connecting said lower flange to said Stirling engine.

2. The co-generation system of claim 1 wherein said circulation circuit includes a pump to force circulation of said fluid through said Stirling engine.

3. The co-generation system of claim 1 wherein said circulation circuit includes two spaced heaters connected in parallel to each other and to said heat exchanger.

4. The co-generation system of claim 1 wherein said cavity includes at least one straight wall and an arcuate bottom.

5. The co-generation system of claim 1 wherein one of said shock absorbing members limits vibration between said engine and said engine mount and said other shock absorbing member limits vibration between said engine mount and said tank.

6. The co-generation system of claim 1, wherein said reticulation system includes a water heat exchanger configured for heating potable water passed therethrough.

7. A co-generation system for producing useful heat and electricity, the system comprising:

- a tank for storing a liquid, the tank having a cavity formed therein, the cavity being encircled by a liquid-receiving section formed between an inner wall of the tank and an internal substantially cylindrical cavity wall;
- a Stirling engine having an engine pressure casing, the engine pressure casing being received within the cavity and having a shape substantially complementary to that of the cavity wall;
- an electric generator operatively connected to the engine and enclosed within the engine pressure casing;
- an exhaust system for venting exhaust gases from the engine, the exhaust system including an exhaust gas heat exchanger positioned within the tank for cooling the exhaust gases;
- an internal circuit including means for forced circulation of the liquid from the tank through the engine, for extracting heat from the engine, and through the exhaust gas heat exchanger, for extracting heat from the exhaust gases, wherein the engine and the exhaust gas heat exchanger are connected in series; and an external circuit for circulating the liquid between the tank and at least one heater for supplying heat therefrom.

8. The co-generation system of claim 7 wherein the internal circuit includes:

a first pipe section connected between a lower end of the tank and a liquid inlet of the exhaust gas heat exchanger;

a second pipe section connected between a liquid outlet of the exhaust gas heat exchanger and an engine cooling liquid inlet;

a third pipe section connected between an engine cooling liquid outlet and an upper end of the tank, and a pump for forcing the liquid through the internal circuit.

9. The co-generation system of claim 7 wherein the internal circuit includes:

a first pipe section connected between a lower end of the tank and an engine cooling liquid inlet;

a second pipe section connected between an engine cooling liquid outlet and a liquid inlet of the exhaust gas heat exchanger;

a third pipe section connected between a liquid outlet of the exhaust gas heat exchanger and an upper end of the tank, and a pump for forcing the liquid through the internal circuit.

10. The co-generation system of claim 7 further including:

a potable water circuit configured for circulating water from a supply separate from the tank;

an external exhaust gas heat exchanger supplied with heat from the exhaust gases and connected to the exhaust system external to the tank;

a water heat exchanger supplied with heat from the liquid and connected to the external circuit, wherein the potable water circuit connects in series the external exhaust gas heat exchanger and the water heat exchanger.

11. The co-generation system of claim 7 wherein a gap is formed between the engine pressure casing and the internal substantially cylindrical cavity wall, and pre-combustion air supplied to the engine is drawn from the gap.

12. A co-generation system for producing useful heat and electricity, the system comprising:

an insulated tank for storing a liquid, the tank being substantially cylindrical with a central axis thereof generally upright, the tank having a cavity formed therein, the cavity being encircled by a liquid-receiving section formed between an inner wall of the tank and an internal substantially cylindrical cavity wall;

a Stirling engine having an engine pressure casing fixed to the tank by a plurality of shock-absorbing engine mounts, the engine pressure casing being received within the cavity and having a shape substantially complementary to that of the internal substantially cylindrical cavity wall;

an electric generator operatively connected to the engine and enclosed within the engine pressure casing;

an exhaust system for venting exhaust gases from the engine, the exhaust system including a contra-flow exhaust gas heat exchanger positioned within the tank for cooling the exhaust gases;

an internal circuit including means for forced circulation of the liquid from the tank through the engine, for extracting heat from the engine, and the exhaust gas heat exchanger, for extracting heat from the exhaust gases, wherein the engine and the exhaust gas heat exchanger are connected in series; and an external circuit for circulating the liquid between the tank and at least one heater configured for supplying heat for space heating in a building.

* * * * *